United States Patent [19]
Kuroe et al.

[11] Patent Number: 6,028,748
[45] Date of Patent: *Feb. 22, 2000

[54] MAGNETIC HEAD APPARATUS INCLUDING A QUARTER WAVELENGTH TRANSMISSION LINE

[75] Inventors: Akio Kuroe, Katano; Akio Murata, Takatsuki; Sayuri Muramatsu, Hirakata, all of Japan

[73] Assignee: Matsushita Electric Industrial Co., Ltd., Osaka-fu, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/869,067

[22] Filed: Jun. 4, 1997

[30] Foreign Application Priority Data

Jun. 4, 1996  [JP]  Japan ................................. 8-141406

[51] Int. Cl.⁷ .............................. G11B 5/48; G11B 21/16
[52] U.S. Cl. ........................... 360/110; 360/104; 360/108
[58] Field of Search .................................... 360/108, 110, 360/115, 125, 104

[56] References Cited

U.S. PATENT DOCUMENTS

| | | | |
|---|---|---|---|
| 4,430,679 | 2/1984 | van de Bult | 360/106 |
| 4,635,152 | 1/1987 | Iwasaki et al. | 360/110 |
| 4,645,280 | 2/1987 | Gordon et al. | 360/104 X |
| 5,491,597 | 2/1996 | Bennin et al. | 360/104 |
| 5,705,926 | 1/1998 | Senda et al. | 360/110 X |
| 5,717,547 | 2/1998 | Young | 360/104 |
| 5,737,152 | 4/1998 | Balakrishnan | 360/104 |
| 5,754,369 | 5/1998 | Balakrishnan | 360/104 |

FOREIGN PATENT DOCUMENTS

| | | |
|---|---|---|
| 0 472 162 A1 | 2/1992 | European Pat. Off. . |
| 0 501 478 A2 | 9/1992 | European Pat. Off. . |
| 5-234170 | 9/1993 | Japan . |
| 6-076245 | 3/1994 | Japan . |
| 08102162 | 4/1996 | Japan . |
| 8-316547 | 11/1996 | Japan . |

OTHER PUBLICATIONS

Reference Data for Engineers: Radio, Electronics, Computers, and Communications, p. 29/23, 1985.

*Primary Examiner*—William R. Korzuch
*Attorney, Agent, or Firm*—Akin, Gump, Strauss, Hauer & Feld, L.L.P.

[57] ABSTRACT

A magnetic head unit of the present invention is provided with a magnetic head having a magnetic impedance element, and a head suspension for suspending the magnetic head is provided with a matching transmission line of one-fourth wavelength for transmitting a high-frequency signal output from the magnetic head.

4 Claims, 14 Drawing Sheets

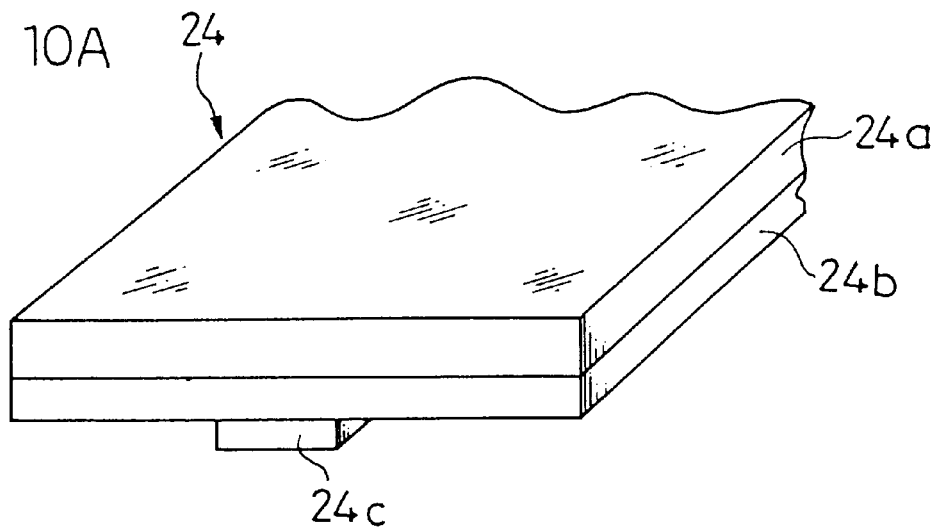
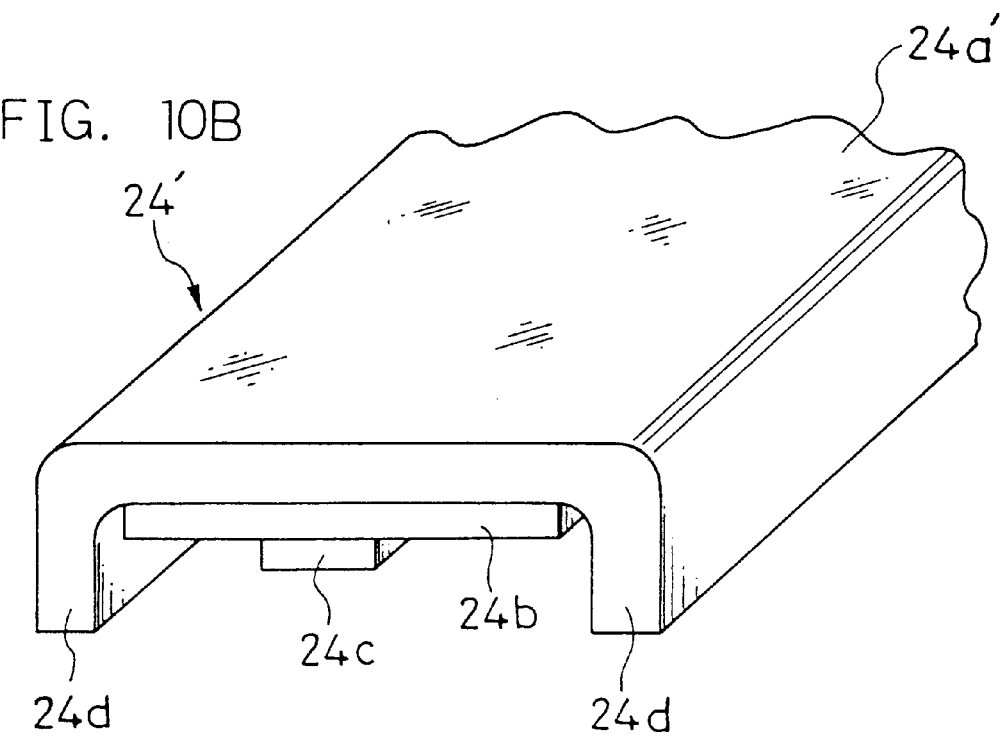

MAGNETIC HEAD APPARATUS INCLUDING A QUARTER WAVELENGTH TRANSMISSION LINE

BACKGROUND OF THE INVENTION

The present invention relates to a magnetic head unit having a magnetic impedance element and for reproducing information recorded on a magnetic recording medium, a method of manufacturing the same and a magnetic recording and reproducing apparatus using the same.

As a magnetic head for a magnetic recording and reproducing apparatus such as a hard disk drive, an inductive magnetic head has been used such as a ferrite head, a MIG (metal-in-gap) head and a thin-film head. These inductive magnetic heads, however, have a problem that when a relative speed is reduced with respect to a magnetic recording medium, an output of a reproduction signal is reduced, so that a reproducing sensitivity degrades.

In order to improve the problem, a conventional integrated magnetic head has been developed and put to practical use. The conventional integrated magnetic head comprises an inductive magnetic head and a magneto-resistive head (hereinafter referred to as "MR head") using a magneto-resistive element. In the conventional integrated magnetic head as disclosed, for example, in a technical report of the magnetics society of Japan, 1991, Vol. 15, No. 2, pp. 141–144, the MR head reproduces information from the magnetic recording medium such as a magnetic tape and the inductive magnetic head records information onto the magnetic recording medium.

A conventional magnetic head unit using the above-mentioned integrated magnetic head will be explained with reference to FIG. 12A, FIG. 12B, FIG. 13A and FIG. 13B concretely.

FIG. 12A is a perspective view showing a configuration of a conventional magnetic head unit. FIG. 12B is a cross-sectional view showing a cross section of a conventional head suspension, taken on the dash and dotted line XIIB of FIG. 12A. FIG. 13A is a cross-sectional view showing a configuration of a principal part of a conventional integrated magnetic head. FIG. 13B is an enlarged perspective view schematically showing a configuration of a MR head shown in FIG. 13A.

In FIG. 12A and FIG. 12B, the conventional magnetic head unit 70 comprises a head slider 72 having an integrated magnetic head 71 mounted thereon, and a head suspension 73 for suspending the head slider 72. The integrated magnetic head 71 is connected to an electric circuit (not shown) such as a reproducing circuit by a metal strand 74. The head slider 72 is attached to an end part of the head suspension 73 by a non-illustrated known head gimbal so that the integrated magnetic head 71 is positioned at a tip end portion of the head suspension 73. The head suspension 73 is made of a metal such as stainless steel and has a screw hole 73a for attaching the head suspension 73 to a rotary arm (not shown) at the other end part thereof. The head suspension 73 also has folded parts 73b for disposing the metal strand 74.

As shown in FIG. 13A and FIG. 13B, the conventional integrated magnetic head 71 comprises an inductive magnetic head 75 for recording information and a MR head 76 for reproducing information. The integrated magnetic head 71 is disposed over a magnetic recording medium 77 such as a magnetic tape so that below-mentioned first and second magnetic gaps 81 and 83 are faced to a magnetic layer 77b provided on a substrate 77a of the magnetic recording medium 77.

The inductive magnetic head 75 comprises first and second magnetic yokes 78 and 79, a winding 80 wound around the first magnetic yoke 78, and the first recording magnetic gap 81 for provided between the first magnetic yoke 78 and the second magnetic yoke 79.

The MR head 76 comprises a ferrite substrate 82, the second reproduction magnetic gap 83 for provided between the second magnetic yoke 79 and the ferrite substrate 82, and a MR element 84 provided in the second magnetic gap 83. The MR element 84 comprises a MR film 84a, a pair of hard magnetic films 84b provided at the end parts of the MR film 84a, and a pair of conductor thin films 84c connected to the end parts of the MR film 84a. The MR film 84a is configured with a high permeability material e.g. by a permalloy film and the like. The electrical resistance of the MR film 84a varies in accordance with the magnetic flux of a signal magnetization 85 formed in the magnetic layer 77b facing to the MR film 84a. In reproducing information, a predetermined current is passed through the MR film 84a from the conductor thin film 84c. The hard magnetic film 84b changes and maintains magnetic domain in the MR film 84a to a single magnetic domain.

An operation of the conventional integrated magnetic head 71 will be explained.

In recording information onto the magnetic recording medium 77, a signal current corresponding to the information is supplied to the winding 80, so that a signal magnetic field is generated and leaked from the first magnetic gap 81. Consequently, the signal magnetization 85 is formed in the magnetic layer 77b of the magnetic recording medium 77 facing to the first magnetic gap 81, so that the information is recorded onto the magnetic recording medium 77.

In reproducing information from the magnetic recording medium 77, the electrical resistance of the MR film 84a varies in accordance with the magnetic flux generated from the signal magnetization 85 flowing from the second magnetic gap 83. Thereby, the current passing through the conductor thin film 84c varies. By detecting a variation in the current with a non-illustrated detecting circuit, a reproduction signal corresponding to the information is produced and the reproduction signal is output.

Thus, in the conventional integrated magnetic head 71 using the MR head 76, since the magnetic flux flowing into the MR film 84a is electromagnetically converted and output as the reproduction signal, a high-output reproduction signal is obtained irrespective of the relative speed with respect to the magnetic recording medium 77. For this reason, the information is reproduced with the reproducing sensitivity approximately three to ten times that of the previously-described inductive magnetic head. In recent years, a giant MR element has been being developed which element is capable of improving the reproducing sensitivity three to ten times that of the MR head 76.

However, the conventional integrated magnetic head 71 having the MR head 76 has a problem that a head structure is complicated compared with the conventional inductive magnetic head. Specifically, in the conventional integrated magnetic head 71, it is necessary to provide the second magnetic gap 83 for reproduction and a non-illustrated shield layer around the MR element 84 and it is also necessary to provide the hard magnetic film 84b in order that the magnetic domain of the MR film 84a is a single magnetic domain. Further, in order to perform reproduction with a linear characteristic, it is necessary to provide a bias layer (not shown) for applying a bias magnetic field and a power source (not shown) for supplying direct current to the bias layer.

In addition, according to a method for manufacturing the conventional integrated magnetic head 71, in order to obtain an excellent magnetic characteristic (reproducing sensitivity), it is necessary to heat the second magnetic yoke 79 and the ferrite substrate 82 provided around the MR element 84.

As a conventional reproducing head intended to solve the problem, such a magnetic impedance head (hereinafter referred to as "MI head") is known that which uses a magnetic impedance element for detecting a variation in magnetic impedance. The conventional MI head was proposed, for example, in a technical report of Institute of Electronics Information and Communication Engineers, Japan, MR95-85.

The conventional MI head will be elucidated with reference to FIG. 14A and FIG. 14B.

FIG. 14A is an explanatory view schematically showing a configuration of a conventional reproducing head using a magnetic impedance element. FIG. 14B is an enlarged view showing a configuration of a soft magnetic core encircled by a dashed line XIVB of FIG. 14A.

In FIG. 14A and FIG. 14B, a conventional MI head 86 comprises a conductor thin film 86a which is a thin film of an electrically conductive metal such as copper, and first and second soft magnetic cores 86b and 86c magnetically coupled to each other and sandwiching the conductor thin film 86a therebetween. One end of the conductor thin film 86a is connected to an end of a high-frequency signal generator 87, and the other end is connected to the other end of the high-frequency signal generator 87 through a resistor 88. The high-frequency signal generator 87 generates a UHF-band high-frequency signal (carrier signal) which is a constant or steady state AC current, and supplies the signal to the conductor thin film 86a. To the one and the other ends of the conductor thin film 86a, terminals 90a and 90b for detecting the variation in the magnetic impedance are connected by lead wires 89a and 89b, respectively. The variation in the magnetic impedance is detected by detecting a variation in voltage between the terminals 90a and 90b. The terminals 90a and 90b are connected to a reproduction signal detecting circuit (not shown) and the reproduction signal is produced based on the variation in the voltage. On the high-frequency signal from the high-frequency signal generator 87, for example, a minute bias DC current is superimposed for biasing the respective magnetizations of the first and second soft magnetic cores 86b and 86c in a predetermined direction. Consequently, the voltage detected between the terminal 90a and 90b varies in accordance with the polarity of the signal magnetization 85 recorded on the magnetic recording medium 77.

The first and second soft magnetic cores 86b and 86c are magnetic cores made of a magnetic material having a high magnetic susceptibility. Specifically, the first and second soft magnetic cores 86b and 86c are laminated films having permalloy films 86d and SiO2 films 86e formed alternately. Dimensions (represented by "P" in FIG. 14A) of the surfaces of the first and second soft magnetic cores 86b and 86 faced to the magnetic recording medium 77 are set so as to equal the width of a track 77c of the magnetic recording medium 77. The easy axes of magnetization in the first and second soft magnetic cores 86b and 86c align parallel to the width of the track 77c. The first and second soft magnetic cores 86b and 86c are electrically insulated from the conductor thin film 86a by a non-illustrated insulating film.

Subsequently, a reproducing operation of the MI head 86 will be described.

When the MI head 86 scans the magnetic recording medium 77, the magnetic flux of the signal magnetization 85 of the magnetic recording medium 77 is passed through the first and second soft magnetic cores 86b and 86c. Consequently, the respective magnetizations in the first and second soft magnetic cores 86b and 86c are inclined from the direction of alignment by the magnetic flux of the signal magnetization 85, so that the impedance of the MI head 86 decreases.

At this time, since the conductor thin film 86a is supplied with the constant AC current from the high-frequency signal generator 87, a drop of voltage proportional to the impedance of the MI head 86 is generated between the terminals 90a and 90b. Accordingly, when the MI head 86 relatively scans the signal magnetization 85 having different polarity and magnitude, the variation in the voltage between the terminals 90a and 90b forms an amplitude modulation wave (hereinafter referred to as "AM wave") with the high-frequency signal current from the high-frequency signal generator 87 as the carrier. The AM wave is demodulated as the reproduction signal at the reproduction signal detecting circuit. When no information is recorded on the magnetic recording medium 77 and the magnetic flux of the signal magnetization 85 is not present, a voltage corresponding to the product of the constant current of the high-frequency signal from the high-frequency signal generator 87 and the impedance between the terminals 90a and 90b is generated between the terminals 90a and 90b.

Thus, the MI head 86 is a reproducing head of a magnetic flux response type directly using the magnetic flux of the signal magnetization 85 without any magnetic gap for reproduction and shielding layer. Moreover, in the portion of the MI head 86 succeeding the terminals 90a and 90b for detection, as described above, the reproduction signal is produced by demodulating the AM wave. For this reason, in the MI head 86, the output of the reproduction signal is easily increased. For example, it is expected that an output is obtained which is approximately ten times that of the reproducing head using the giant MR element.

However, in the MI head 86, since the high-frequency signal generated by the high-frequency signal generator 87 is used, there occurs problems that electromagnetic radiation is caused by the high-frequency signal and external noises readily intrude. Further, when the MI head 86 is mounted on the conventional head suspension 73 shown in FIG. 12A, the head suspension 73 functions as an antenna, so that a sufficient signal-to-noise ratio cannot be obtained due to the electromagnetic radiation and the external noises. In addition, a transmission line for transmitting the high-frequency signal (current signal) supplied to the MI head 86 and a transmission line for transmitting the high-frequency signal (voltage signal) output from the MI head 86 form a distributed element circuit and perform impedance matching so that no loss is produced due to a reflected wave on the transmission lines.

The electromagnetic radiation can be suppressed by using a coaxial cable as the transmission lines. However, since the existing coaxial cables are great in diameter, it is difficult to mount the existing coaxial cables on the conventional head suspension 73. Further, the coaxial cable is high in stiffness and heavy in weight compared with the metal strand 74 shown in FIG. 12A. For this reason, the coaxial cable can hinder the head suspension from performing the seek operation at high speed. In addition, the coaxial cable, which increases the load imposed on the head suspension because of it weight, can make it difficult to adjust the distance between the magnetic head and the surface of the magnetic recording medium, namely, flying height of the magnetic head during operation. When the coaxial cable is reduced in diameter so that it can be mounted on the head suspension 73, the loss of the transmitted signal increases and the cost increases.

BRIEF SUMMARY OF THE INVENTION

The object of the present invention is to provide a magnetic head unit that can solve the aforementioned problems.

In order to achieve the above-mentioned object, a magnetic head unit comprises:

- a magnetic sensor with thin film for detecting a magnetic impedance which varies responding with variation of magnetic flux of a signal magnetization of a magnetic recording medium,
- a magnetic head slider having at least the magnetic sensor with thin film,
- a high-frequency signal generator for supplying a predetermined high-frequency signal to the magnetic sensor with thin film, and
- a head suspension for suspending the magnetic head slider and the high-frequency signal generator, the head suspension having a signal line for transmitting the high-frequency signal representative of the magnetic impedance detected by the magnetic sensor with thin film, the signal line substantially forming a matching transmission line of one-fourth wavelength of the high-frequency signal.

In a magnetic head unit in accordance with the present invention, the head suspension for suspending the magnetic head slider having the magnetic sensor with thin film is used also as a microstrip line for transmitting the high-frequency signal output from the magnetic sensor with thin film. Thereby, electromagnetic radiation due to the high-frequency signal and external noises are suppressed. As a result, the SNR between the reproduction signal and noise is improved and reproducing sensitivity is easily improved.

BRIEF DESCRIPTION OF THE SEVERAL VIEWS OF THE DRAWING

FIG. 10A is an enlarged perspective view showing a configuration of a head suspension of a magnetic head unit in a third embodiment of the present invention.

FIG. 10B is an enlarged cross-sectional view showing a modification of the head suspension shown in FIG. 10A.

It will be recognized that some or all of the Figures are schematic representations for purposes of illustration and do not necessarily depict the actual relative sizes or locations of the elements shown.

DETAILED DESCRIPTION OF THE INVENTION

Hereafter, preferred embodiments of the present invention will be described with reference to the accompanying drawings.

First Embodiment

Figure 1:
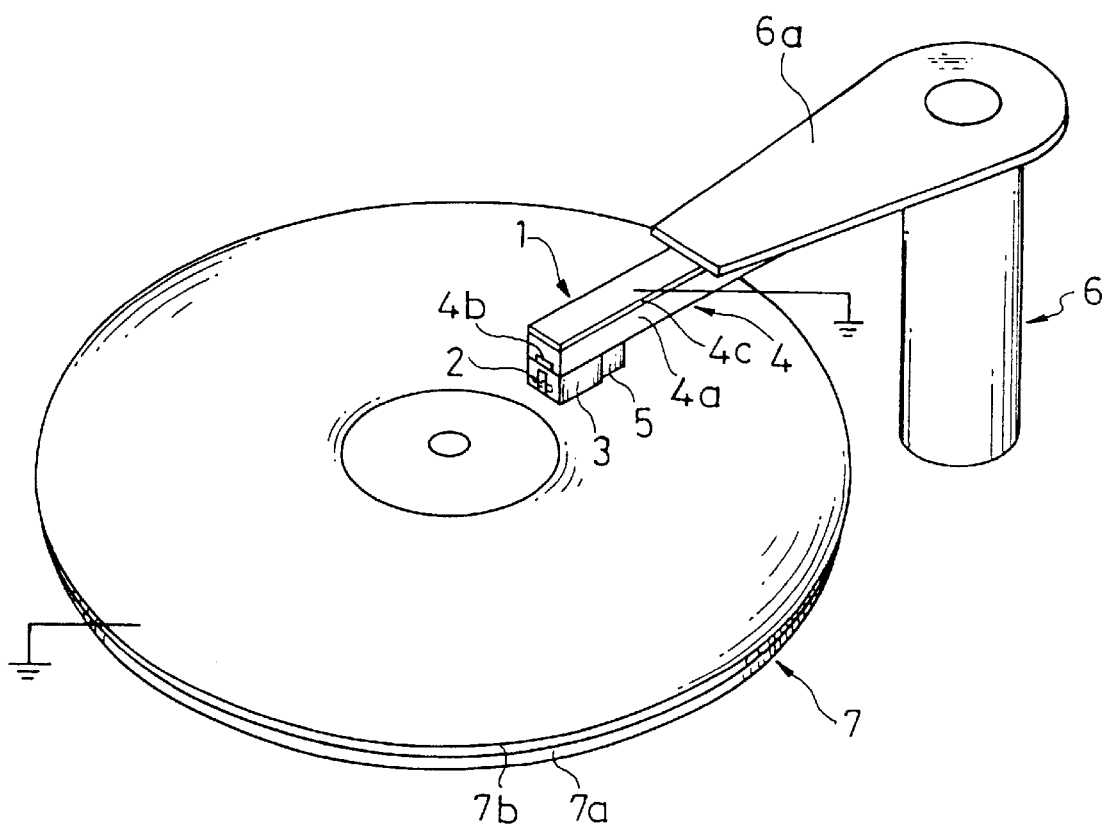
FIG. 1 is a perspective view showing a configuration of a magnetic recording and reproducing apparatus having a magnetic head unit in a first embodiment of the present invention.
Figure 2A:
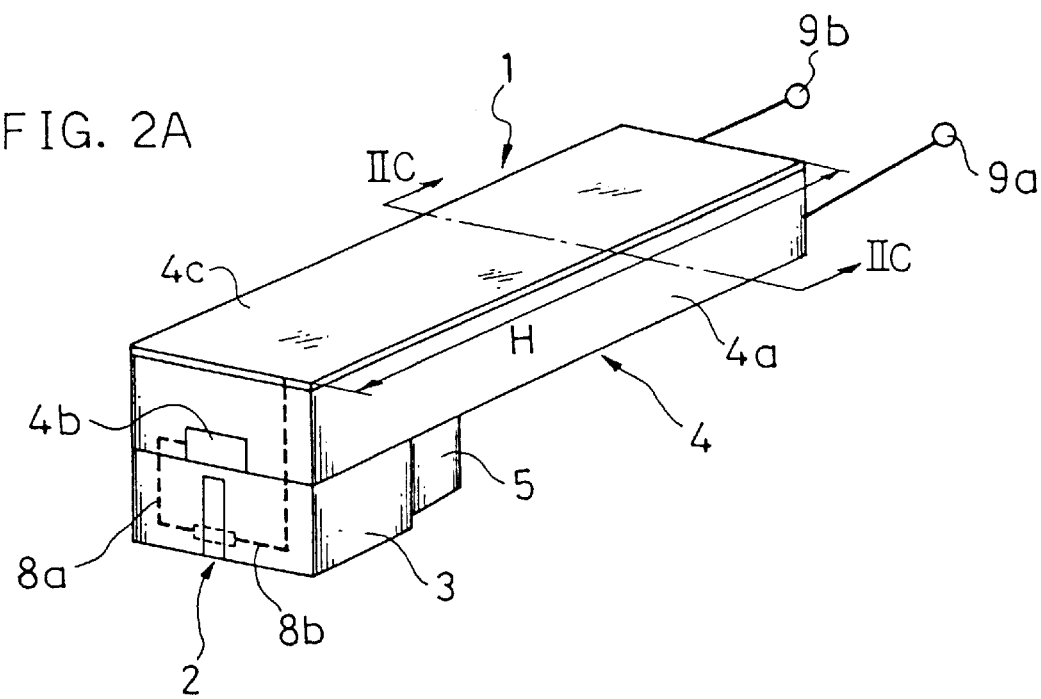
FIG. 2A is a perspective view showing a configuration of the magnetic head unit shown in FIG. 1.
Figure 2B:
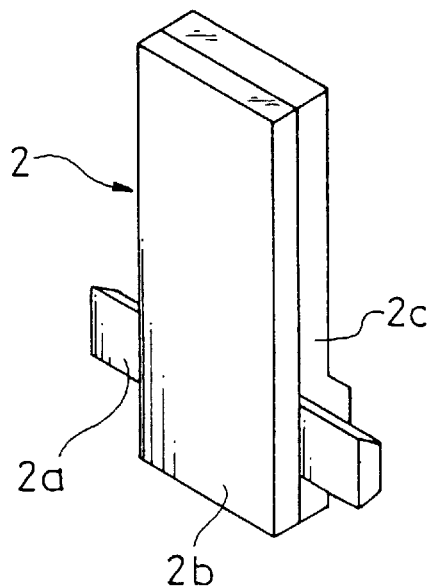
FIG. 2B is an enlarged perspective view schematically showing a configuration of a magnetic impedance head.
Figure 2C:
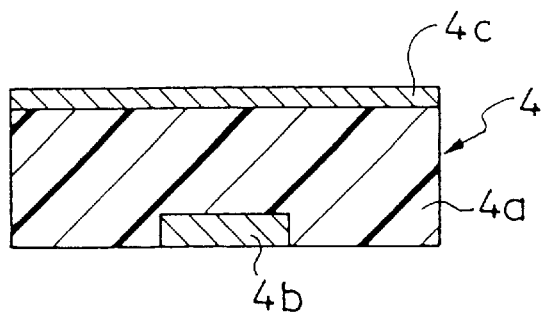
FIG. 2C is an enlarged cross-sectional view showing a configuration of a head suspension, taken on a dashed line IIC of FIG. 2A.

FIG. 1 is a perspective view showing a configuration of a magnetic recording and reproducing apparatus having a magnetic head unit in a first embodiment of the present invention. FIG. 2A is a perspective view showing a configuration of the magnetic head unit shown in FIG. 1. FIG. 2B is an enlarged perspective view schematically showing a configuration of a magnetic impedance head. FIG. 2C is an enlarged cross-sectional view showing a configuration of a head suspension, taken on a dashed line IIC of FIG. 2A. The following description will be given with respect to a hard disk drive having a magnetic disk as the magnetic recording medium. With regard to known elements such as the inductive magnetic head for recording information onto the magnetic disk, description will be omitted.

In FIG. 1 to FIG. 2C, a magnetic head unit 1 comprises a head slider 3 equipped with a magnetic impedance head 2 (hereinafter referred to as "MI head") having a magnetic impedance element, a head suspension 4 suspending the head slider 3 and used also as a microstrip line, and a high-frequency signal generator 5 suspended from the head suspension 4 and outputting a predetermined high-frequency signal to the MI head 2. The magnetic head unit 1 is connected to a rotary arm 6a of an actuator 6 and held so as to be rotatable. The magnetic head unit 1 is disposed so that the MI head 2 is faced to a metal magnetic layer 7b provided on a disk substrate 7a of a magnetic disk 7. The disk substrate 7a is made of, for example, aluminum or carbon. The metal magnetic layer 7b is made of, for example, cobalt-chromium-tantalum. In the magnetic disk 7, either the disk substrate 7a or the metal magnetic layer 7b is connected to the ground of the hard disk drive.

The MI head 2 is a magnetic sensor with thin film for detecting the magnetic impedance which varies responding with variation of the magnetic flux of the signal magnetization recorded on the metal magnetic layer 7b. The MI head 2 amplitude-modulates the high-frequency signal (current signal) from the high-frequency signal generator 5 based on the detected variation in magnetic impedance, and outputs the modulated high-frequency signal (voltage signal) to the below-mentioned demodulator by way of the head suspension 4. Specifically, the MI head 2 comprises a conductor thin film 2a, and first and second soft magnetic cores 2b and 2c magnetically coupled to each other and sandwiching the conductor thin film 2a therebetween. The MI head 2 is secured to an attachment portion provided in the head slider 3 so that one surface of the rectangular second soft magnetic core 2b coincides with one surface of the head slider 3.

The conductor thin film 2a is a thin film of a conductive metal of about 1 μm thickness of such as copper. The first and second soft magnetic cores 2b and 2c are magnetic cores made of a magnetic material having a high magnetic susceptibility and comprise laminated films having permalloy thin films and SiO2 films formed alternately. The conductor thin film 2a and the first and second soft magnetic cores 2b and 2c are electrically insulated from each other by a non-illustrated insulating film. To both ends of the conductor thin film 2a, the high-frequency signal generator 5 is connected (not shown) and a high-frequency signal (carrier signal) is supplied which is a constant AC current from the high-frequency signal generator 5. The frequency of the high-frequency signal is, for example, 300 MHz to 2 GHz.

Further, the one and the other ends of the conductor thin film 2a are connected to a signal line 4b of the microstrip line and to a grounded plate 4c by lead wires 8a and 8b, respectively. To the signal line 4b of the microstrip line and the grounded plate 4c, terminals 9a and 9b for detecting a variation in the magnetic impedance are connected, respectively. The variation in the magnetic impedance is detected by detecting a variation in voltage between the terminals 9a and 9b. On the high-frequency signal from the high-frequency signal generator 5, for example, a minute bias DC current is superimposed for biasing the respective magnetizations of the first and second soft magnetic cores 2b and 2c in a predetermined direction. Consequently, the voltage detected between the terminals 9a and 9b varies in accordance with the polarity of the signal magnetization recorded on the magnetic recording medium 7.

The head suspension 4 has a slim rectangular form (a strip form) and is used also as the microstrip line for transmitting the high-frequency signal output from the MI head 2. Specifically, the head suspension 4 comprises a dielectric substrate 4a made of, for example, silicon or alumina having a high relative dielectric constant, the signal line 4b which is a thin film of a metal such as copper being excellent in conductivity and that is formed along the length of the head suspension 4 in the central portion along the width on the bottom surface of the head suspension 4, and the grounded plate 4c having a plate form and formed on the upper surface of the dielectric substrate 4a. The signal line 4b and the grounded plate 4c are formed on opposing surfaces of the dielectric substrate 4a. The signal line 4b is formed on the dielectric substrate 4a by photolithography. The grounded plate 4c of the head suspension 4 is connected, as shown in FIG. 1, to the ground of the hard disk drive. Further, in the head suspension 4, in order to maximize the output at the terminal 9a, the signal line 4b forms a matching transmission line of one-fourth wavelength. That is, the length of the signal line 4b shown by "H" in FIG. 2A equals to the length of one-fourth wavelength of the high-frequency signal from the high-frequency generator 5. As well known, the length of one-fourth wavelength is in inverse proportion to the square root of the dielectric constant of material of the dielectric substrate 4a. Specifically, when the frequency of the high-frequency signal is 1 GHz and the material of the dielectric substrate 4a is Si, SiO2 or alumina, the length of the head suspension 4 is 2.1, 3.8 or 2.4 cm. Since the microstrip line includes the conductor thin film 2a and the lead wires 8a and 8b, strictly, the length of the microstrip line is shorter than the length of the one-fourth wavelength. The head slider 3 and the high-frequency signal generator 5 are secured onto the surface of the head suspension 4 where the signal line 4b is provided.

Thus, in the magnetic head unit 1 according to this embodiment, the head suspension 4 for suspending the MI head 2 is used also as the microstrip line for transmitting the high-frequency signal output from the MI head 2. Further, the member 4c being grounded is provided on the upper surface of the head suspension 4. Thereby, electromagnetic radiation due to the high-frequency signal and the external noises are suppressed. As a result, the SNR between the reproduction signal and noise is improved and reproducing sensitivity is readily improved.

Further, the grounded plate 4c, and the disk substrate 7a or the metal magnetic layer 7b of the magnetic disk 7 are connected to the ground of the hard disk drive as mentioned above. For this reason, the MI head 2 and the signal line 4b are disposed between the grounded plate 4c and the magnetic disk 7 being grounded, so that the electromagnetic wave radiated from the MI head 2 and the signal line 4b is shielded.

According to a result of an experiment by the inventors, in order to prevent the electromagnetic radiation from the MI head 2, by disposing the MI head 2 inside the projection surface of the grounded plate 4c of the microstrip line on the surface of the magnetic disk 7, a high shielding effect was obtained.

Subsequently, concrete configuration and operation of the magnetic head unit 1 will be explained with reference to FIG. 3.

Figure 3:
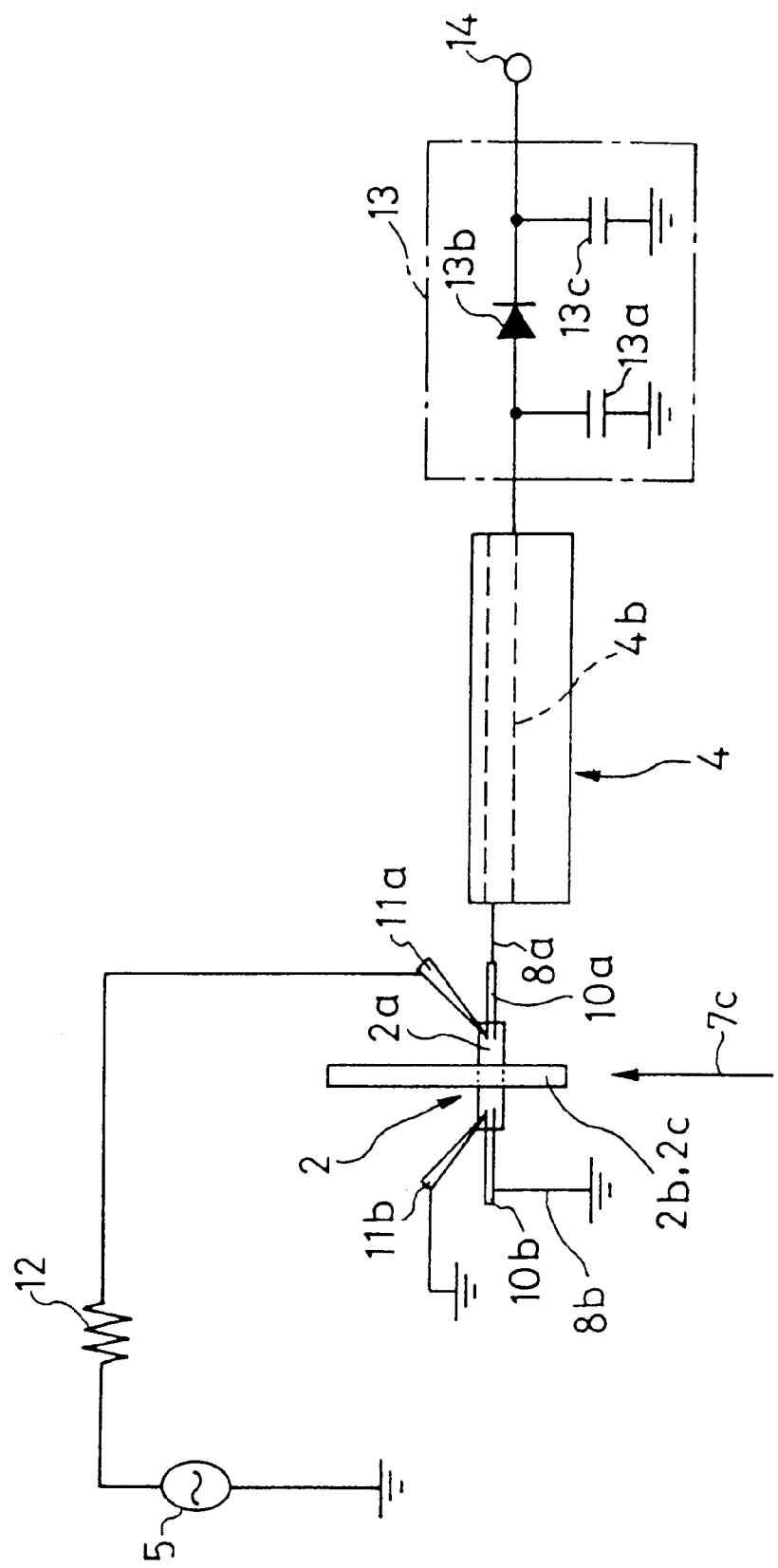
FIG. 3 is a block diagram showing an equivalent circuit of the magnetic head unit shown in FIG. 1.

FIG. 3 is a block diagram showing an equivalent circuit of the magnetic head unit shown in FIG. 1.

As shown in FIG. 3, at the both ends of the conductor thin film 2a of the MI head 2, a pair of electrodes 10a and 10b and a pair of electrodes 11a and 11b are provided. The electrodes 10a, 10b, 11a and 11b are made of a metal such as copper, and embedded in the head slider 3 (FIG. 2). One end of the high-frequency signal generator 5 is connected to one end of the conductor thin film 2a through a resistor 12 and the electrode 11a, and the other end of the high-frequency signal generator 5 is grounded. One end of the conductor thin film 2a is connected to one end of the lead wire 8a through the electrode 10a, and the other end of the conductor thin film 2a grounded through the electrodes 10b and 11b. The signal line 4b of the suspension 4 functioning as the microstrip line has one end connected to the other end of the lead wire 8a and has the other end connected to a demodulator 13 comprising capacitors 13a and 13c and a diode 13b.

When the MI head 2 scans the magnetic disk 7 (FIG. 1), the magnetic flux of a signal magnetization 7c of the magnetic recording medium 7 is passed through the first and second soft magnetic cores 2b and 2c. Consequently, the respective magnetizations in the first and second soft magnetic cores 2b and 2c are inclined from the direction of alignment by the magnetic field determined by the quantity of magnetic flux of the signal magnetization 7c, so that the impedance of the MI head 2 decreases.

At this time, since the conductor thin film 2a is supplied with the constant AC current superimposed with the minute bias DC current from the high-frequency signal generator 5, a drop of voltage proportional to the impedance of the MI head 2 is generated between the electrodes 10a and 10b. Thereby, when the MI head 2 relatively scans the signal magnetization 7c having different polarity and magnitude, the variation in the voltage between the electrodes 10a and 10b is an amplitude modulation wave (hereinafter referred to as "AM wave") with the high-frequency signal current from the high-frequency signal generator 5 as the carrier. The AM wave is the high-frequency signal (voltage signal) representative of the magnetic impedance from the MI head 2, and is demodulated as a reproduction signal at the demodulator 13 and output to an electric circuit such as an amplifier circuit by way of an output terminal 14. When no information is recorded on the magnetic disk 7 and the magnetic flux of the signal magnetization 7c is not present, a voltage corresponding to the product of the constant current of the high-frequency signal from the high-frequency signal generator 5 and the impedance between the electrodes 10a and 10b is generated between the electrodes 10a and 10b. The demodulator 13 for demodulating the AM wave is not limited to the circuit comprising the capacitors 13a and 13c and the diode 13b but may have any circuit arrangement as long as the demodulated reproduction signal is highest at the output terminal 14.

Subsequently, a method for manufacturing the head suspension 4 used also as the microstrip line will be elucidated with reference to FIG. 4A to FIG. 4F. The following description will be given with respect to a case where the dielectric substrate 4a of the head suspension 4 is a silicon substrate.

Figure 4A:
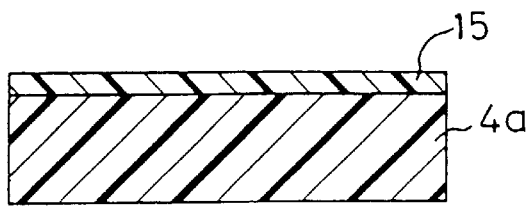
FIG. 4A is an enlarged cross-sectional view showing a cross section of the head suspension in a state after a resist layer is formed on the silicon substrate.
Figure 4B:
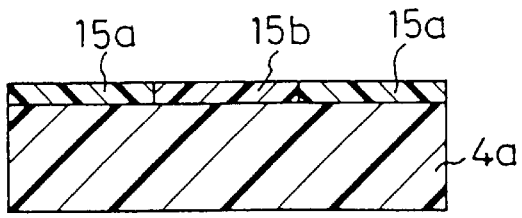
FIG. 4B is an enlarged cross-sectional view showing the cross section of the head suspension in a state after the resist layer is partly exposed to light.
Figure 4C:
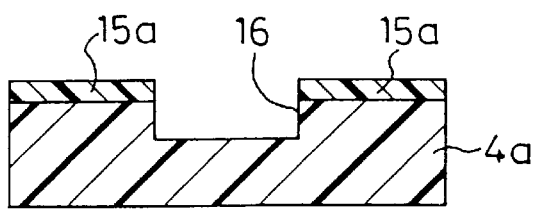
FIG. 4C is an enlarged cross-sectional view showing the cross section of the head suspension in a state after a concave portion is formed in the silicon substrate.
Figure 4D:
FIG. 4D is an enlarged cross-sectional view showing the cross section of the head suspension in a state after the resist layer is removed.
Figure 4E:
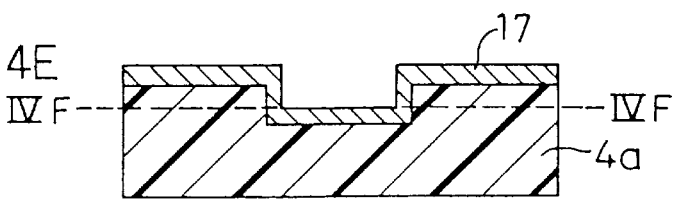
FIG. 4E is an enlarged cross-sectional view showing the cross section of the head suspension in a state after a metal thin film is formed on the silicon substrate.
Figure 4F:
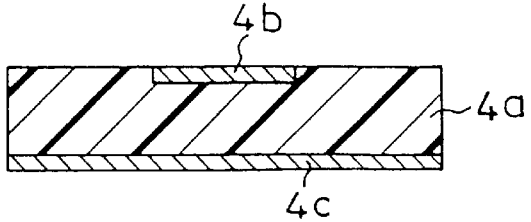
FIG. 4F is an enlarged cross-sectional view showing the cross section of the head suspension in a completed state.

FIG. 4A is an enlarged cross-sectional view showing a cross section of the head suspension in a state after a resist layer is formed on the silicon substrate. FIG. 4B is an enlarged cross-sectional view showing the cross section of the head suspension in a state after the resist layer is partly exposed to light. FIG. 4C is an enlarged cross-sectional view showing the cross section of the head suspension in a state after a concave portion is formed in the silicon substrate. FIG. 4D is an enlarged cross-sectional view showing the cross section of the head suspension in a state after the resist layer is removed. FIG. 4E is an enlarged cross-sectional view showing the cross section of the head suspension in a state after a metal thin film is formed on the silicon substrate. FIG. 4F is an enlarged cross-sectional view showing the cross section of the head suspension in a completed state.

In FIG. 4A, first, the rectangular silicon substrate 4a having predetermined dimensions is cut out from a silicon wafer (not shown). Then, a resist layer 15 is formed on one surface of the silicon substrate 4a by spin coating and the formed resist layer 15 is dried. Then, in FIG. 4B, after a non-illustrated mask is placed on a central portion 15b of the resist layer 15, side portions 15a of the resist layer 15 are exposed to light. Then, in FIG. 4C, after the central portion 15b not having been exposed to light is removed, the silicon substrate 4a is chemically etched, so that a concave portion 16 is formed in the silicon substrate 4a. Then, as shown in FIG. 4D, the side portions 15a of the resist layer 15 are removed from the silicon substrate 4a.

Figure 5A:
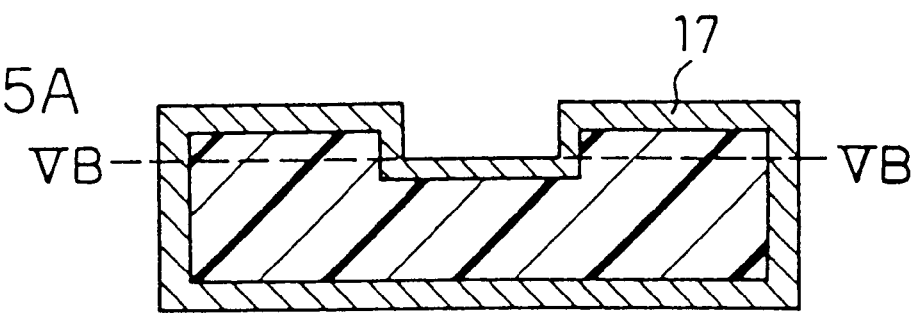
FIG. 5A is an enlarged cross-sectional view showing a cross section of a first modification of the head suspension in the first embodiment in a state after the metal thin film has been formed on the silicon substrate.
Figure 5B:
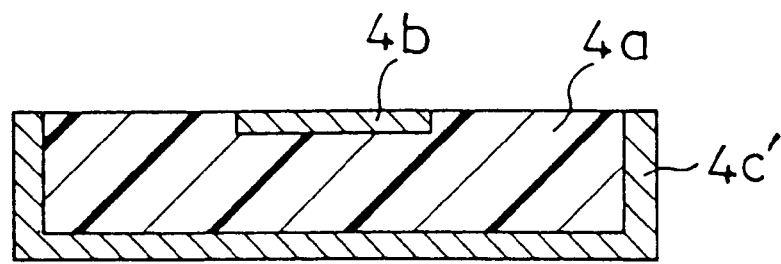
FIG. 5B is an enlarged cross-sectional view showing the cross section of the head suspension of FIG. 5A in a completed state.

Then, in FIG. 4E, on the silicon substrate 4a in which the concave portion 16 has been formed, a copper thin film 17 is formed by sputtering deposition. Then, the silicon substrate 4a and the thin film 17 are polished along the dashed line IVF of FIG. 4E, so that the signal line 4b is formed on the silicon substrate 4a. Then, in FIG. 4F, the grounded plate 4c of the microstrip line is formed by forming a copper thin film by sputtering deposition on the surface parallel to the surface where the thin film 17 (signal line 4b) is formed. As shown in FIG. 5A, after the copper thin film 17 is formed over the entire surface of the silicon substrate 4a by plating as shown in FIG. 5A, the silicon substrate 4a and the thin film 17 are polished along the dashed line VB of FIG. 5A. Then, as shown in FIG. 5B, the grounded plate 4c' may be formed not only on the surface parallel to the surface where the signal line 4b has been formed but also on the side surfaces of the head suspension 4. With this configuration, the shielding effect improves on the electromagnetic radiation along the side surfaces and the external noises.

Figure 6A:
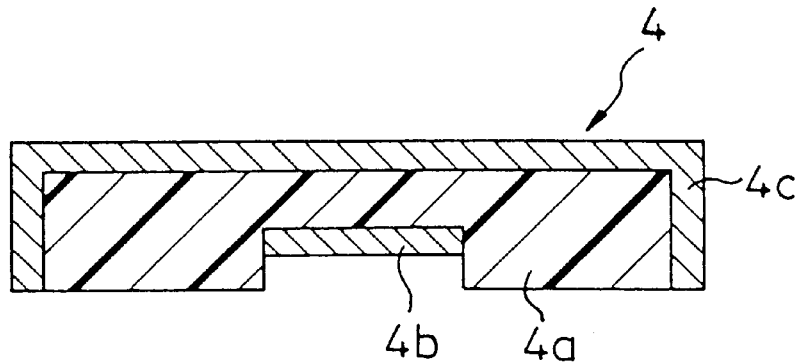
FIG. 6A is an enlarged cross-sectional view showing a cross section of a second modification of the head suspension in the first embodiment.
Figure 6B:
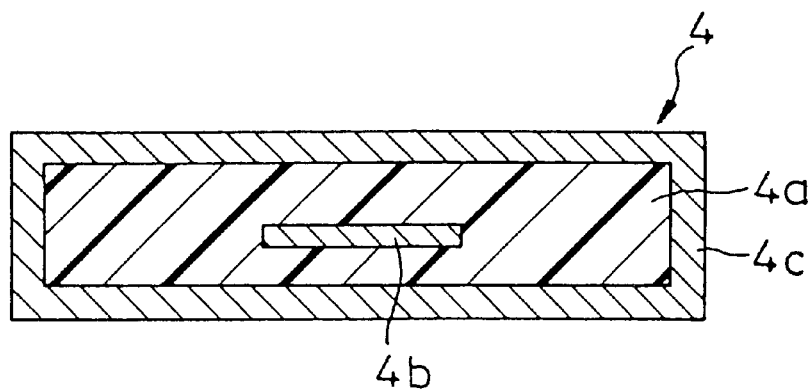
FIG. 6B is an enlarged cross-sectional view showing a cross section of a third modification of the head suspension according in the first embodiment.
Figure 6C:
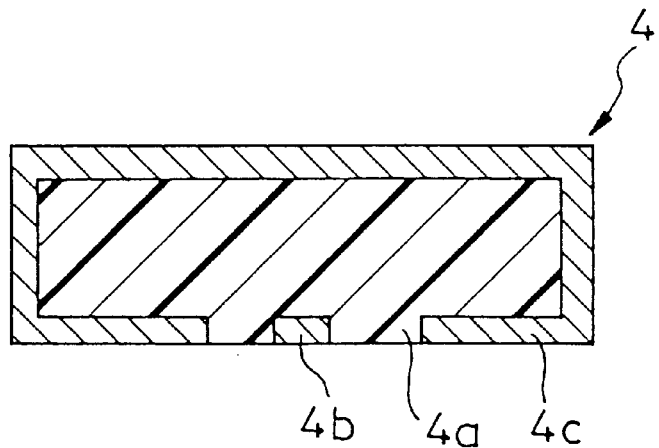
FIG. 6C is an enlarged cross-sectional view showing a cross section of a fourth modification of the head suspension in the first embodiment.

As a result of an experiment by the inventors, it has been confirmed that by forming the head suspension 4 so as to have any of the cross-sectional configuration shown in FIG. 6A to FIG. 6C, the head suspension has an excellent shielding effect. The head suspension 4 with the configuration shown in FIG. 6B has a structure similar to the coaxial cable and completely prevented the electromagnetic radiation with respect to the entire periphery of the signal line 4b.

While the concave portion 16 is formed in the silicon substrate 4a by chemical etching in the above explanation, it may be formed by dry etching or mechanical processing. The dielectric substrate 4a of the head suspension 4 may be formed by polishing glass, carbon or alumina until it is thin instead of polishing silicon. While copper is used for the signal line 4b of the microstrip line and the grounded plate 4c, another conductive material such as gold, silver or aluminum may be used.

Second Embodiment

Figure 7A:
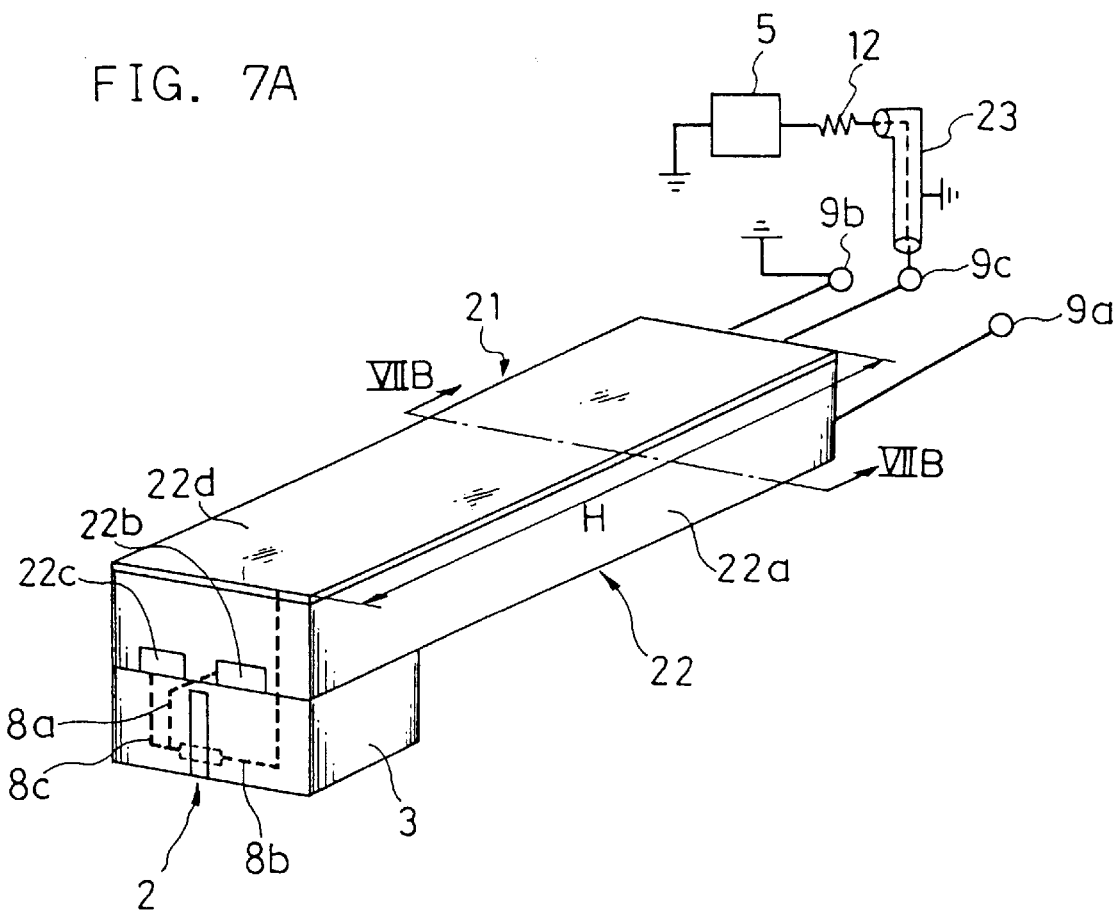
FIG. 7A is an enlarged perspective view showing a configuration of a magnetic head unit in a second embodiment of the present invention.
Figure 7B:
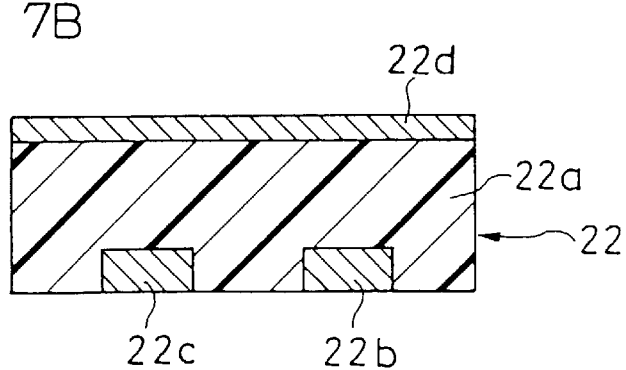
FIG. 7B is an enlarged cross-sectional view showing a cross section of a head suspension, taken on a dashed line VIIB of FIG. 7A.
Figure 8:
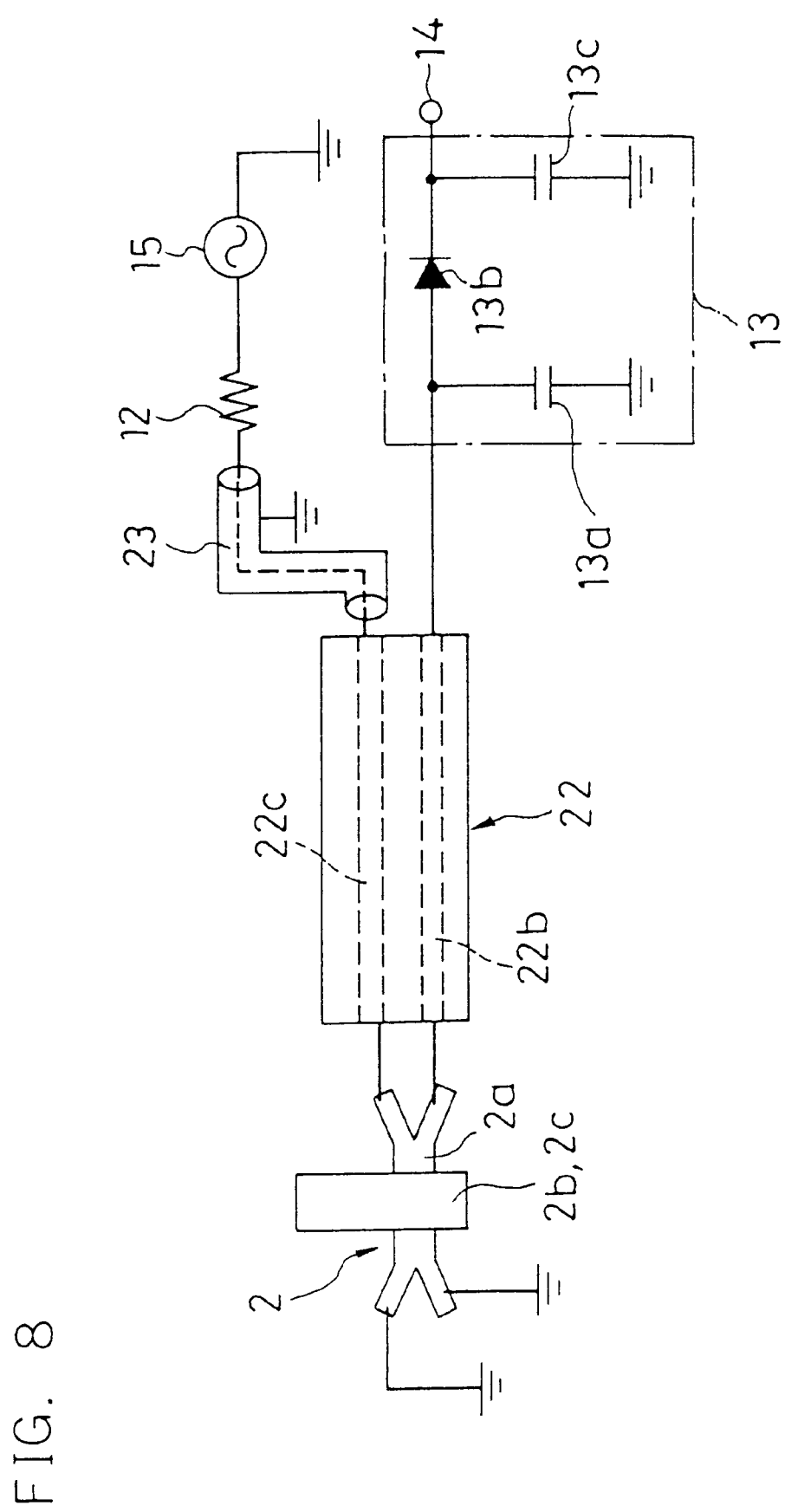
FIG. 8 is a block diagram showing an equivalent circuit of the magnetic head unit shown in FIG. 7A.

FIG. 7A is an enlarged perspective view showing a configuration of a magnetic head unit in a second embodiment of the present invention. FIG. 7B is an enlarged cross-sectional view showing a cross section of a head suspension, taken on a dashed line VIIB of FIG. 7A. FIG. 8 is a block diagram showing an equivalent circuit of the magnetic head unit shown in FIG. 7A.

According to this embodiment, in a configuration of the magnetic head unit, the high-frequency signal generator is not secured to the head suspension, and the head suspension is provided with another signal line for inputting the high-frequency signal from the high-frequency signal generator to the MI head. The other elements and portions are similar to those of the first embodiment and will not be described.

As shown in FIG. 7A to FIG. 8, a head suspension 22 has a slim rectangular form (a strip form) and is used also as the microstrip line for transmitting the high-frequency signal input and output from the MI head 2. Further, the head suspension 22 forms the matching transmission line of one-fourth wavelength so that the output of the MI head 2 is highest at the terminal 9a. Specifically, the head suspension 22 comprises a dielectric substrate 22a made of, for example, silicon or alumina having a high relative dielectric constant, a first signal line 22b for outputting the high-frequency signal from the high-frequency signal generator 5 to the MI head 2, a second signal line 22c for outputting the high-frequency signal representative of the variation in the magnetic impedance detected by the MI head 2 from the MI head 2 to the demodulator 13, and a grounded plate 22d connected to the ground of the hard disk drive. The second signal line 22c is the same as the signal line 4b of the first embodiment. The first and second signal lines 22b and 22c are formed to be parallel to each other on the same surface of the dielectric substrate 22a along the length of the head suspension 22, and are connected to the conductor thin film 2a by the lead wires 8a and 8c, respectively. The grounded plate 22d is formed on the surface opposite the surface of the dielectric substrate 22a where the first and second signal lines 22b and 22c are formed.

The high-frequency signal generator 5 is disposed not directly on the head suspension 22 but at another part of the hard disk drive such as the rotary arm 6a. One end of the high-frequency signal generator 5 is connected through the resistor 12 and a coaxial cable 23 to the terminal 9c connected to the second signal line 22c. The other end of the high-frequency signal generator 5 is grounded. With this configuration, the load imposed on the head suspension 22 is small compared with that of the first embodiment. As a result, it is easily achieved to increase the speed of movement of the head suspension 2 and to reduce the load imposed on the MI head 2.

Figure 9A:
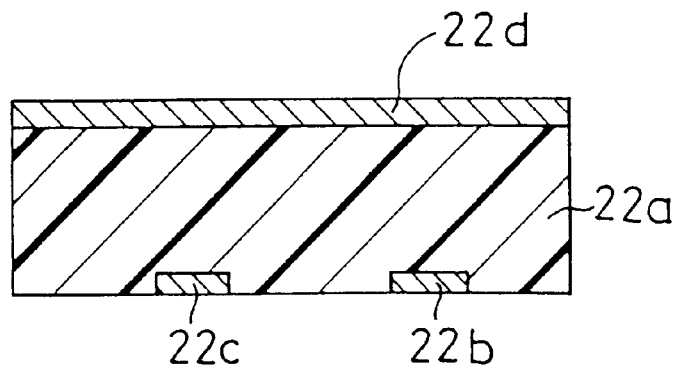
FIG. 9A is an enlarged cross-sectional view showing a cross section of the head suspension shown in FIG. 7A.
Figure 9B:
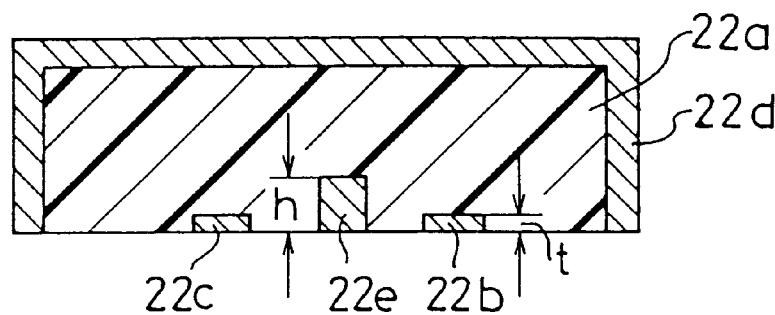
FIG. 9B is an enlarged cross-sectional view showing a cross section of a first modification of the head suspension shown in FIG. 7A.
Figure 9C:
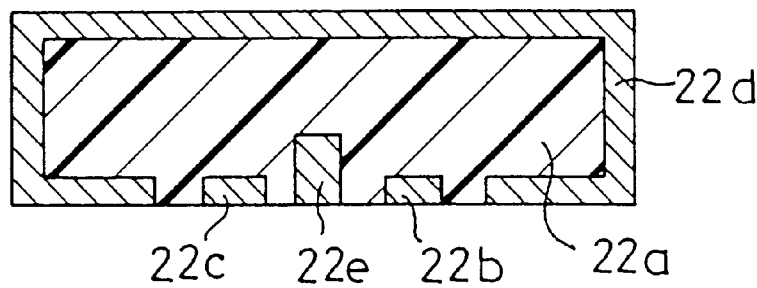
FIG. 9C is an enlarged cross-sectional view showing a cross section of a second modification of the head suspension shown in FIG. 7A.
Figure 9D:
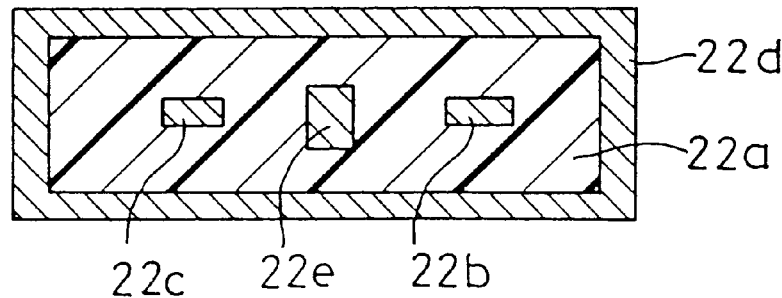
FIG. 9D is an enlarged cross-sectional view showing a cross section of a third modification of the head suspension shown in FIG. 7A.

Cross-sectional configurations of the head suspension 22 having an excellent shielding effect in the magnetic head unit in this embodiment are shown in FIG. 9A to FIG. 9D. The effectiveness of the configurations of the head suspension 22 has been confirmed through an experiment by the inventors. Furthermore, according to a result of the experiment by the inventors, the head suspensions 22 whose cross sections are shown in FIG. 9B to FIG. 9D were by far more excellent in electromagnetic wave shielding effect than that shown in FIG. 9A. In the configurations shown in FIG. 9B to FIG. 9D, it is necessary to consider shielding between the first and second signal lines 22b and 22c and it is necessary to form a grounded line 22e. In the case that the grounded line 22e is formed, as shown in FIG. 9B to FIG. 9D, the grounded line 22e is formed so that a dimension "h" thereof is greater than a dimension "t" of the signal lines 22b and 22c. It has been experimentally confirmed that this arrangement remarkably improves the shielding between the first and second signal lines 22b and 22c. Specific examples of "t" and "h" are 1 $\mu$m and 5 $\mu$m, respectively.

Third Embodiment

FIG. 10A is an enlarged perspective view showing a configuration of a head suspension of a magnetic head unit in a third embodiment of the present invention. FIG. 10B is an enlarged cross-sectional view showing a modification of the head suspension shown in FIG. 10A. According to this embodiment, in a configuration of the magnetic head unit, the head suspension is fabricated by forming a dielectric layer on a metal thin plate and providing a signal line on the dielectric line. The other elements and portions are similar to those of the first embodiment and will not be described.

In FIG. 10A, a head suspension 24 comprises a metal thin plate 24a of, for example, stainless steel, a dielectric layer 24b provided on the metal thin plate 24a, and a signal line 24c provided on the dielectric layer 24b. The dielectric layer 24b is formed by a polyimide film and the like. The signal line 24c is made of, for example, copper like the signal line 4b of the first embodiment. The dielectric layer 24b and the signal line 24c are provided along the length of the head suspension 24.

An example of a method for manufacturing the head suspension 24 is such that the signal line 24c is formed by forming a copper thin film on the dielectric layer 24b by sputtering and then, the dielectric layer 24b is bonded onto the metal thin plate 24a with an organic adhesive. In the head suspension 24 of this embodiment, the metal thin plate 24a is connected, for example, to the ground of the hard disk drive and functions as the grounded plate of the microstrip line. Instead of the polyimide film, a dielectric layer of an organic material may be formed by spin coating or sputtering deposition and the signal line 24c may be formed on the dielectric layer. In order to improve the shielding effect, as shown in FIG. 10B, bent portions 24d may be provided at each end of a metal thin plate 24a'. The bent portions 24d are formed by bending the edges of the metal thin plate 24a' toward the signal line 24c.

Fourth Embodiment

Figure 11A:
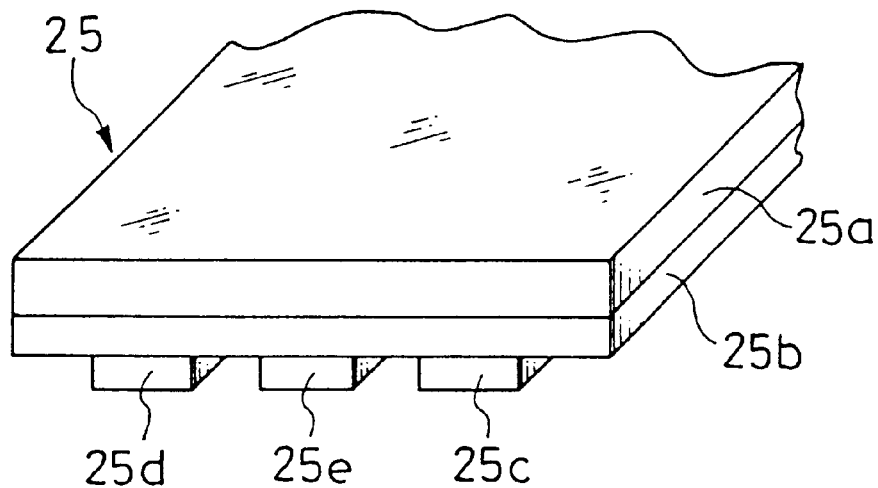
FIG. 11A is an enlarged perspective view showing a configuration of a head suspension of a magnetic head unit in a fourth embodiment of the present invention.
Figure 11B:
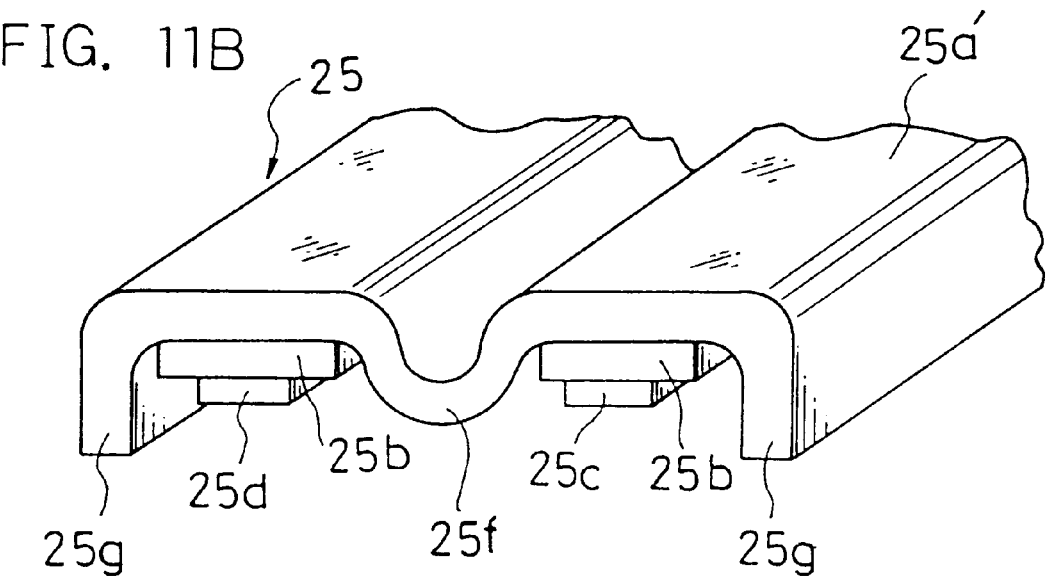
FIG. 11B is an enlarged cross-sectional view showing a modification of the head suspension shown in FIG. 11A.
Figure 12A:
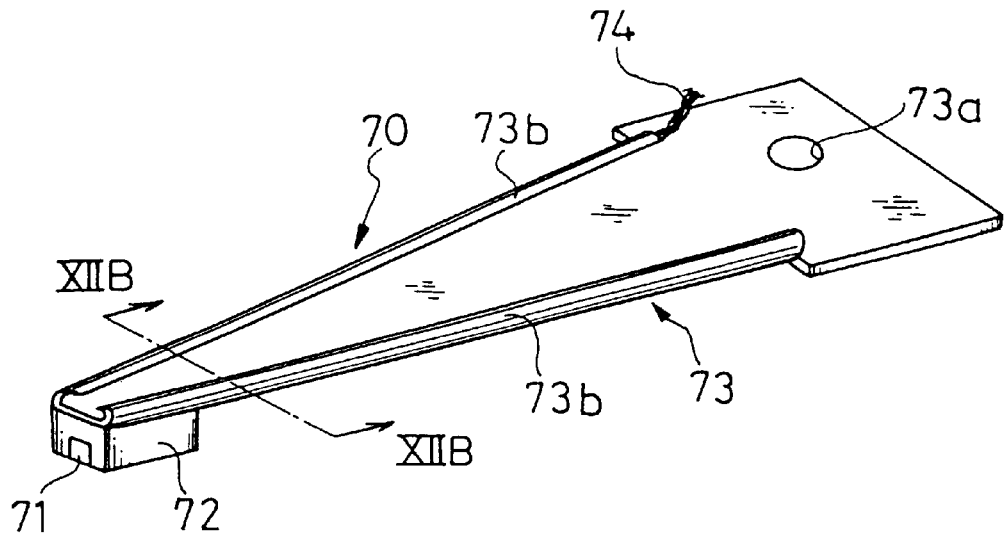
FIG. 12A is a perspective view showing a configuration of a conventional magnetic head unit.
Figure 12B:
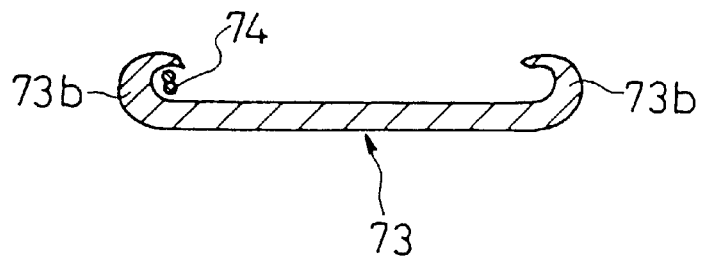
FIG. 12B is a cross-sectional view showing a cross section of a conventional head suspension, taken on the dash and dotted line XIIB of FIG. 12A.
Figure 13A:
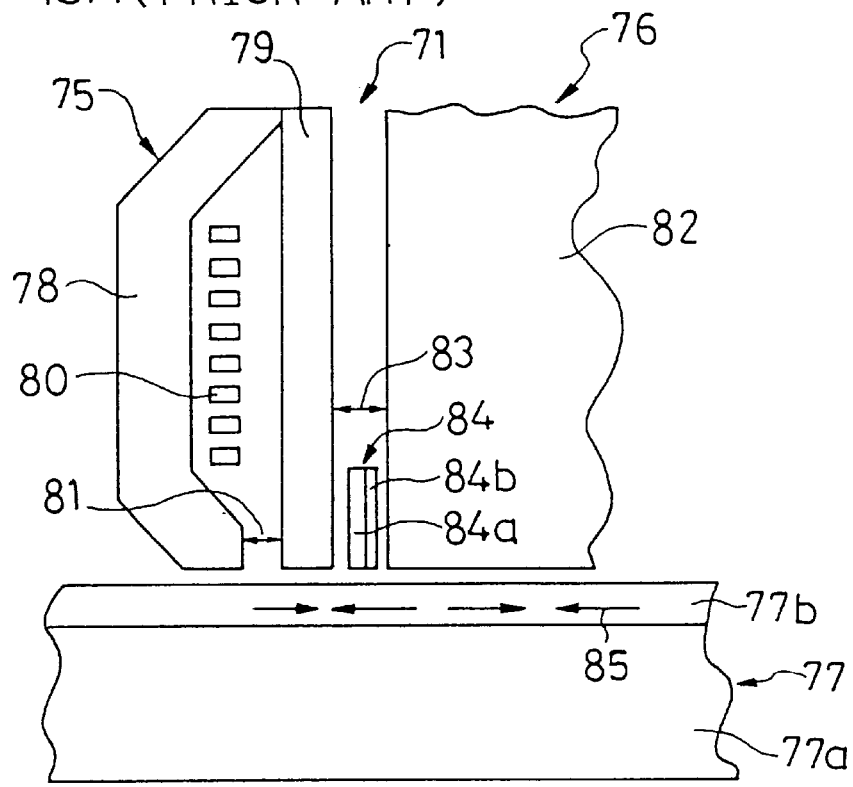
FIG. 13A is a cross-sectional view showing a configuration of a principal part of a conventional integrated magnetic head.
Figure 13B:
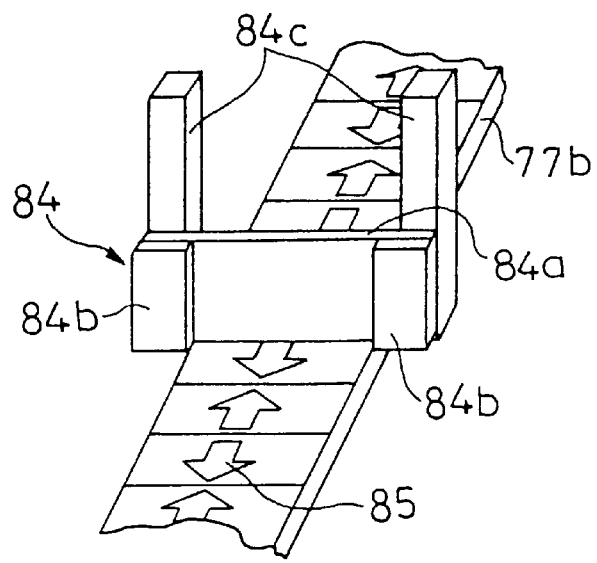
FIG. 13B is an enlarged perspective view schematically showing a configuration of a MR head shown in FIG. 13A.
Figure 14A:
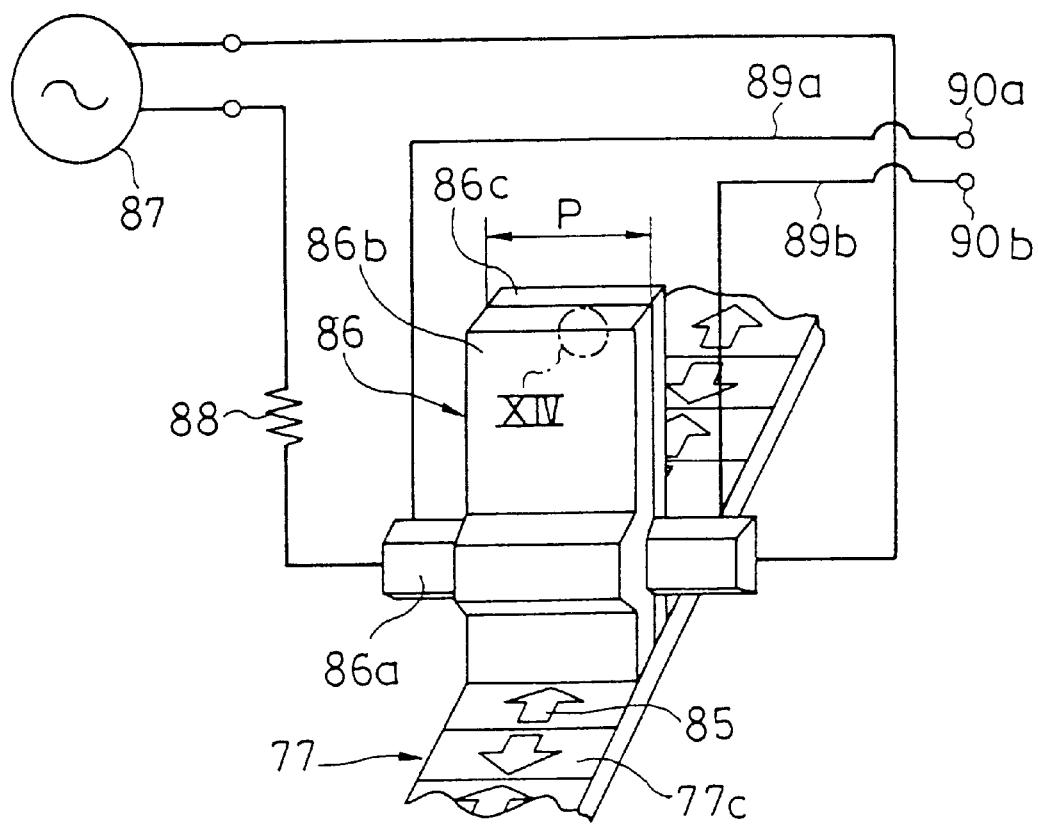
FIG. 14A is an explanatory view schematically showing a configuration of a conventional reproducing head using a magnetic impedance element.
Figure 14B:
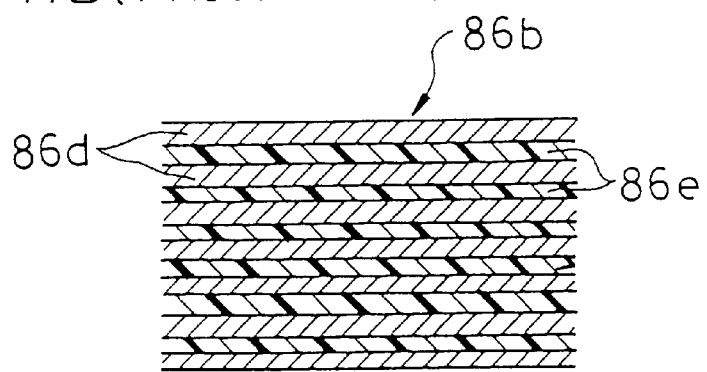
FIG. 14B is an enlarged view showing a configuration of a soft magnetic core encircled by a dashed line XIVB of FIG. 14A.

FIG. 11A is an enlarged perspective view showing a configuration of a head suspension of a magnetic head unit in a fourth embodiment of the present invention. FIG. 11B is an enlarged cross-sectional view showing a modification of the head suspension shown in FIG. 11A. According to this embodiment, in a configuration of the magnetic head unit, the high-frequency signal generator is not secured to the head suspension, and the head suspension is provided with another signal line for inputting the high-frequency signal from the high-frequency signal generator to the MI head. The other elements and portions are similar to those of the third embodiment and will not be described.

In FIG. 11A, a head suspension 25 comprises a metal thin plate 25a of, for example, stainless steel, a dielectric layer 25b provided on the metal thin plate 25c, third and fourth signal lines 25c and 25d provided on the dielectric layer 25b, and a grounded line 25e provided between the third and fourth signal lines 25c and 25d. The dielectric layer 25b comprises is formed by the polyimide film and the like. The third signal line 25c is made of, for example, copper like the first signal line 22b of the second embodiment, and outputs the high-frequency signal from the high-frequency signal generator 5 to the MI head 2. The fourth signal lines 25d is made of, for example, copper like the second signal lines 22c of the second embodiment, and outputs from the MI head to the demodulator 13 the high-frequency signal representative of the variation in the magnetic impedance detected by the MI head 2. The metal thin plate 25a and the grounded line 25e are connected, for example, to the ground of the hard disk drive. The grounded line 25e serves as a shield between the third and fourth signal lines 25c and 25d. The dielectric layer 25b, the third and fourth signal lines 25c and 25d, and the grounded line 25e are provided along the length of the head suspension 25.

In order to improve the shielding effect, as shown in FIG. 11B, bent portions 25g may be provided at each end of a metal thin plate 25a'. The bent portions 25g are formed by bending the edges of the metal thin plate 25a' toward the signal lines 25c and 25d. Instead of providing the grounded line 25e, a convex portion 25f protruding toward the signal lines 25c and 25d may be provided by pressing the central portion of the metal thin plate 25a.

While the dielectric film is made of an organic material polyimide in the above-described embodiment, it may be made of an inorganic material such as alumina, SiO2 or glass.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A magnetic head unit comprising:
a thin film magnetic sensor faced to a magnetic recording medium for detecting a magnetic impedance which varies according to variations of magnetic flux of a signal magnetization of said magnetic recording medium;
a magnetic head slider including said thin film magnetic sensor;
a high-frequency signal generator for supplying a predetermined high-frequency signal to said thin film magnetic sensor, and
a head suspension for suspending said magnetic head slider and said high-frequency signal generator, said head suspension including an inorganic dielectric substrate, a signal line and a grounded plate, said grounded plate having high electrical conductivity and being located on one surface of said inorganic dielectric substrate so as to be opposed to said signal line located on an opposite surface of said inorganic dielectric substrate, said signal line, inorganic dielectric substrate and grounded plate substantially forming a matching microstrip transmission line of one-fourth wavelength of said high-frequency signal for transmitting said high-frequency signal representative of said magnetic impedance variation detected by said thin film magnetic sensor.

2. A magnetic head unit in accordance with claim 1, wherein said inorganic dielectric substrate is a silicon substrate and said signal line is formed on the silicon substrate with photolithography.

3. A magnetic recording and reproducing apparatus comprising:
a magnetic head unit having:
a thin film magnetic sensor faced to a magnetic recording medium and having a grounded electrode, for detecting a magnetic impedance which varies according to variations of a magnetic flux of a signal magnetization of said magnetic recording medium;
a magnetic head slider including said thin film magnetic sensor;
a high-frequency signal generator for supplying a predetermined high-frequency signal to said thin film magnetic sensor; and
a head suspension for suspending said magnetic head slider and said high-frequency signal generator, said head suspension including an inorganic dielectric substrate, a signal line and a grounded plate, said grounded plate having high electrical conductivity and being located on one surface of said inorganic dielectric substrate so as to be opposed to said signal line located on an opposite surface of said inorganic dielectric substrate, said signal line, inorganic dielectric substrate and grounded plate substantially forming a matching microstrip transmission line of one-fourth wavelength of said high-frequency signal for transmitting said high-frequency signal representative of said magnetic impedance variation detected by said thin film magnetic sensor, wherein said signal line is disposed between said grounded plate and a surface of said magnetic recording medium to be grounded, thereby obtaining a high shielding effect for electromagnetic radiation from said signal line.

4. A magnetic recording and reproducing apparatus in accordance with claim 3, wherein said thin film magnetic sensor is mounted on said magnetic head slider so as to be interposed between said grounded plate and said recording medium.

* * * * *